United States Patent [19]

Mann

[11] 4,142,602
[45] Mar. 6, 1979

[54] APPARATUS FOR CONTROLLING THE TRAVELING SPEED OF A MOTOR VEHICLE

[75] Inventor: Arnold Mann, Bieber, Fed. Rep. of Germany

[73] Assignee: VDO Adolf Schindling AG, Frankfurt am Main, Fed. Rep. of Germany

[21] Appl. No.: 821,720

[22] Filed: Aug. 4, 1977

[30] Foreign Application Priority Data

Aug. 14, 1976 [DE] Fed. Rep. of Germany ....... 2636745

[51] Int. Cl.² .............................................. B60K 31/00
[52] U.S. Cl. ................................. 180/108; 123/103 R
[58] Field of Search ............... 180/105 E, 105 R, 108; 123/102, 103 R

[56] References Cited

U.S. PATENT DOCUMENTS

| | | | |
|---|---|---|---|
| 3,195,672 | 7/1965 | Brennan | 180/105 R |
| 4,039,043 | 8/1977 | Mann et al. | 180/108 |

Primary Examiner—John A. Pekar
Assistant Examiner—Donn McGiehan
Attorney, Agent, or Firm—Martin A. Farber

[57] ABSTRACT

An apparatus for controlling the traveling speed of a motor vehicle with an electric control unit acted upon by a speed dependent signal, which unit compares the actual traveling speed with a predetermined desired traveling speed, and upon a deviation transmits a signal which is dependent on the size of the deviation to a control stage. The control stage comprises a pneumatic actuator which acts on an element, preferably a throttle valve, which influences the ratio of a fuel-air mixture fed to the motor of the vehicle, as well as two electromagnetically actuatable valves coordinated to the actuator, the valves enabling the actuator to be admitted with reduced pressure, or normal pressure, respectively. The control stage includes an electromagnetic system having an excitation coil and an armature cooperating therewith. The armature is pivotally mounted for smooth pivoting from a rest position, in which position both of the two valves are closed, against the force of a spring, which force is dependent on the stroke of the actuator, into operating positions, respectively, in which positions one of the two valves is opened and the other valve is closed. An additional valve admits the pneumatic actuator with above-atmospheric or normal pressure, respectively, when the excitation coil becomes currentless.

8 Claims, 3 Drawing Figures

APPARATUS FOR CONTROLLING THE TRAVELING SPEED OF A MOTOR VEHICLE

The invention relates to an apparatus for controlling the traveling speed of a motor vehicle with an electric control unit acted upon by a speed dependent signal, which unit compares the then present traveling speed with a predetermined desired traveling speed, and upon a deviation transmits a signal which is dependent on the size of the deviation to a control stage. The control stage comprises a pneumatic actuator acting on an element, preferably the throttle valve, which influences the ratio of the fuel-air mixture fed to the motor of the vehicle, as well as two electromagnetically actuatable valves coordinated to the actuator. By means of the valves, the actuator is enabled so as to be admitted with reduced pressure or normal pressure, respectively; whereby the control stage contains an electromagnetic system with an excitation coil and an armature, which armature is pivotable jerk-free or smoothly from a rest position (in which both valves are closed) against the force of a spring, which force is dependent on the stroke of the actuator, into operating positions, in which operating positions, respectively, one of the two valves is opened and the other valve is closed.

With motor vehicles with a controlling mechanism or a change-over gear and a vehicle speed control device, as it is particularly described in U.S. patent application Ser. No. 665,312, filed Mar. 9, 1976, now U.S. Pat. No. 4,039,043, this patent hereby being incorporated herein by reference, the following can occur. If, by means of the control device, the throttle valve is adjusted to the full open throttle condition, and if for any reason the clutch is actuated in the sense of a disconnection or release—for example in order to shift into 3rd gear from 4th gear with hill or mountain driving—the motor operates for a short time with an excessive rotational speed, until the control device has brought the throttle valve into a reduced position or setting of the rotational speed. This can lead to increased water on the motor parts and in the limiting case to damage to the motor, particularly during the motor starting phase, in which phase the motor has not yet attained full operating temperature.

It is an object of the invention to improve the device of the above-identified patent such that such excessive rotational speed no longer occurs, or it only occurs to a negligible degree.

It is another object of the invention to aid the solution of the above mentioned object, in the manner that an additional valve (96) is provided, which valve, with the excitation coil (25) becoming currentless, i.e., without current, admits and communicates the pneumatic actuator with normal pressure, the additional valve having a passageway with a large cross-section. The excitation coil can become currentless, upon switching the control device off, for example, by shifting or releasing the clutch.

By means of this additional valve, with the excitation coil becoming currentless, the actuator not only is admitted with normal pressure via one of the two originally existing valves (8), but rather additionally is admitted with normal pressure via the additional valve (96). As a result, the time duration for leading the throttle valve back to a position which reduces the rotational speed is greatly lowered, such that an excessive rotational speed no longer occurs to the previous extent.

Advantageously with the additional valve having a passageway with cross-section which is larger than that of the two valves, then the excessive rotational speed can be made negligible.

According to one embodiment form of the invention the additional valve is an electromagnetic valve. According to another embodiment form of the invention the additional valve is actuatable by the armature. Such an embodiment form has the advantage compared to the previously named embodiment, that it can be provided with an extremely low expense.

With the above and other objects and advantages in view, the present invention will become more clearly understood in connection with the following detailed description of preferred embodiments, when considered with the accompanying drawings, of which:

Figure 1:
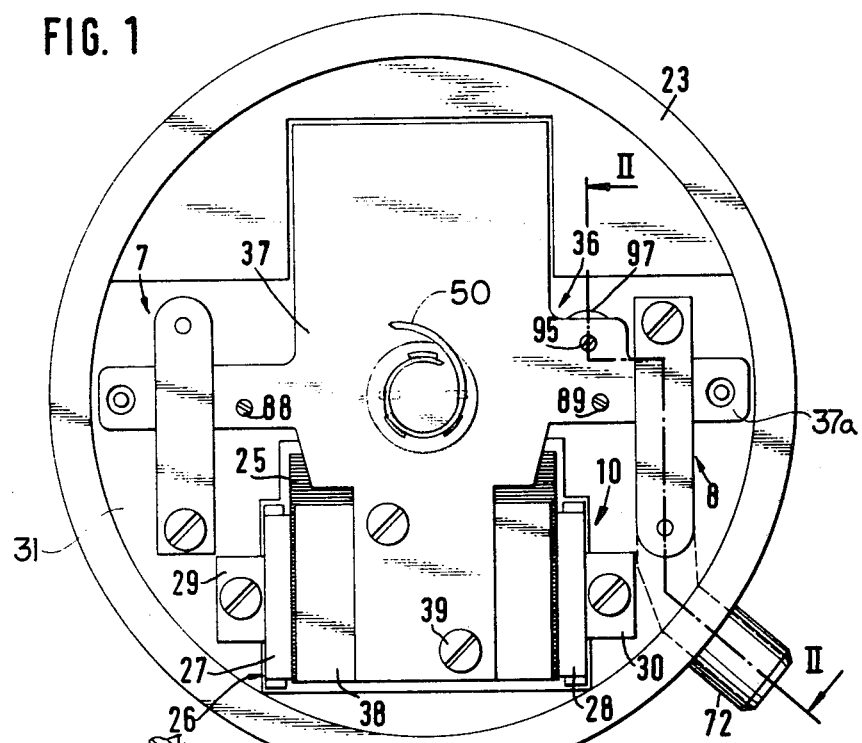
FIG. 1 is a top plan view of the control stage of the device in accordance with the invention with the actuator removed for clarity of illustration.

Referring now to the drawings, the control stage of the device contains a pneumatic actuator 6, which is admissible with a reduced or partial pressure $P_U$, or with ambient air $P_A$, respectively. The actuator 6 is disposed above an armature 36, and actuates the throttle valve 9 on the motor of the vehicle. An actuator spring 50 operatively engages the actuator 6 and the armature 36. An electromagnetic system 10 is provided for opening and closing of valves 7 and 8. The system 10 is disposed in a control circuit.

The electromagnetic system 10 includes an excitation coil 25, which is mounted in a yoke 26, the latter having legs 27 and 28, respectively, each provided with a projection 29 and 30, respectively, which projections serve for fastening the yoke 26 on the face or front side 31 of the housing part 23. Furthermore the armature 36 of the electromagnetic system is also operatively mounted on the front side 31 of the housing part 23.

The armature 36 is formed of a four-armed main part 37, on one arm of which an armature plate 38 is secured by means of two screws 39. The armature plate 38 is positioned on that arm of the main part 37 adjacent the legs 27 and 28 of the yoke 26, the plate 38 immerging or being insertable up and down between the legs of the yoke depending on the average current through the excitation coil 25, which current is dependent on a speed change of the vehicle.

Figure 2:
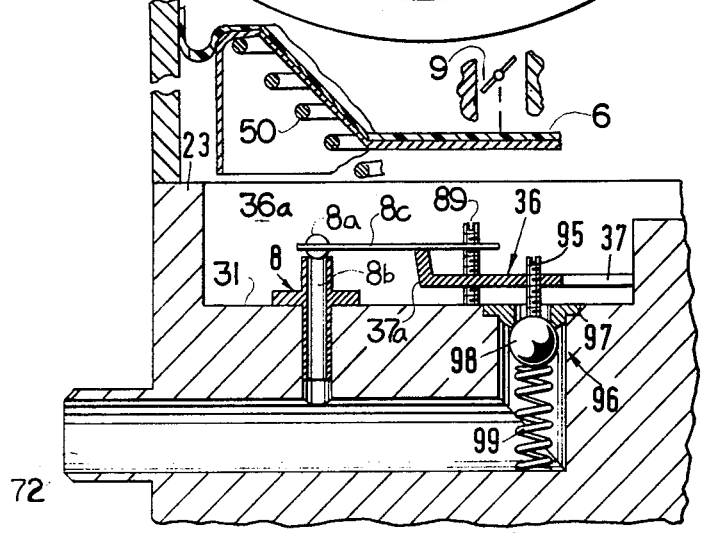
FIG. 2 is a section taken along the lines II—II through the control stage of the device according to FIG. 1 partially broken away.

Each of the two other arms of the armature main part 37 which are opposite each other (that is the horizontally illustrated arms in FIG. 1, one arm 37a of which is shown in FIG. 2), with its respective upwardly bent end can actuate one of the two valves 7 and 8. The armature 36 is mounted by two bearing bolts 88 and 89, which are supported on the front side 31 of the housing part 23 and which are screwed into the armature 36, thereby supporting the armature 36; the bearing bolts 88 and 89 constitute pivot pins by which the armature 36 is pivotally mounted on the front side 31 of the housing part 23 about a pivot axis constituting a line through the pivot pins 88 and 89. Upon a pivoting of the armature in one or the other direction about this pivot axis due to the extent of the armature plate 38 lowering or raising between the legs 27 and 28 of the yoke 26, one of the valves 7 or 8 is opened and the other valve 8 or 7 remains closed.

The corresponding arm 37a of the armature 36, which arm 37a is coordinated to the ventilation or air valve 8, furthermore carries a setting or adjusting screw 95 which is adjustably screwed therethrough. By means of this screw 95 an additional valve 96 can be actuated. The valve 96 comprises a valve seat 97 formed in the front side 31 of the housing part 23 and a ball-shaped closure member 98. The closure member 98 is pressed upwardly against the valve seat 97 by means of a compression spring 99 disposed in the conduit 72. On one side the valve 8 as well as the valve 96 stand in communication with the connection conduit 72, and on the other side these valves stand in connection with the pressure chamber 36a of the actuator, so that, if the valve 8 is opened by means of a sufficient pivoting of the armature 36, also the valve 96 is actuated by means of the setting screw 95. The ball-shaped valve closure member 8a (e.g. made of an elastic material) is held on the valve tube 8b by means of a spring plate 8c on which the ball is mounted, the spring plate being for example secured at its end remote from the closure member 8a by screws (not shown) on the front side 31 of the housing part 23 and prestressed so as to press the closure member 8a on the valve tube 8b. Consequently the ambient atmospheric air (or above-atmospheric air as the case may be) communicating with the connection conduit 72 can arrive in the pressure chamber 36a of the actuator (the valves 8 and 96 opening into this pressure chamber 36a which is above the valves) via the valve 8 as well as via the valve 96, the latter having a comparatively large passageway opening cross-section relative to that of the valve tube 8b. This leads to a quick pivoting back of the throttle valve into a rotational speed-reducing position.

As may be seen in FIG. 2, one of the arms 37a of the armature 36 is bent upwardly at its end operatively adjacent the spring sheet 8c. When the armature 36 is sufficiently pivoted about its pivot axis 89, 88 so as to raise the spring sheet 8c and thus the valve closure member 8a which then opens the valve 8, the portion of the arm 37a on the other side of the pivot axis 89, 88 presses the closure member 98 of the additional valve 96 downwardly via the setting screw 95 against the force of the spring 99, to likewise open the additional valve 96. Generally when the control device is operative, if the speed of the vehicle reduces relative to the set desired speed, the armature plate 38 is drawn deeper between the legs of the yoke 26 by the excitation coil 25 due to an increase of the excitation current, whereby the armature 36 pivots to open the valve 7 and reduced pressure enters the actuator chamber 36a, whereby the pneumatic actuator 6 moves downwardly and the force of the spring 50 on the armature increases to pivot the latter back to its rest position range as well as the throttle valve in the sense of a speed increase; if the speed of the vehicle increases over the set desired speed, the excitation coil current decreases, whereby the armature plate 38 raises and the armature is pivoted so as to open the valve 8, whereby the actuator moves upwardly and the force of the spring 50 on the armature decreases so as to pivot the latter back to its rest position range as well as the throttle valve in the sense of a speed reduction—however the valve 96 is not opened until the current in the excitation coil 25 is reduced to zero whereby the pivoting of the armature 36 is sufficiently increased so as to also open the additional valve 96, whereby by the latter action is brought about more quickly.

Figure 3:
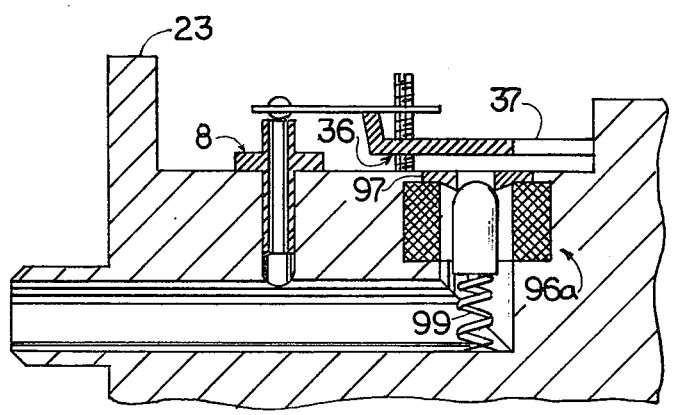
FIG. 3 is a schematic illustration of the additional valve constituting an electromagnetic valve.

FIG. 3 shows the additional valve as an electromagnetic valve 96a operable when the current in the excitation coil 25 becomes zero.

While there has been disclosed two embodiments of the invention, it is to be understood that these embodiments are given by example only and not in a limiting sense.

I claim:

1. An apparatus for controlling the traveling speed of a motor vehicle with an electric control unit acted upon by a speed dependent signal, which unit compares the actual traveling speed with a predetermined desired traveling speed and upon a deviation transmits a signal which is dependent on the size of the deviation to a control stage which acts on an element, preferably a throttle valve, which influences the ratio of a fuel-air mixture fed to a motor of the vehicle, comprising a control stage including a moveable pneumatic actuator means for actuating the element, said actuator means forming a pressure chamber, two electromagnetically actuatable valve means each defining a passageway operatively connected to said pressure chamber of said actuator means for admitting said pressure chamber of said actuator means with reduced pressure and normal pressure, respectively, said control stage further comprising an electromagnetic system having an excitation coil and an armature means operatively cooperating therewith, spring means for biasing said armature means and having a spring force dependent on the position of said actuator means, said armature means being pivotally mounted for smooth pivoting from a rest position in which both of said two valve means are closed, against the force of said spring means into operating positions, respectively, in which one of said two valve means is opened and the other of said two valve means is closed, an additional valve means connected to the same said pressure chamber of said actuator means for admitting said pressure chamber of said actuator means with normal pressure when said excitation coil becomes currentless, said additional valve means being formed with a passageway having a cross-section which is larger than that of said passageway of one of said two valve means.

2. The apparatus, as set forth in claim 1, wherein said additional valve means is an electromagnetic valve.

3. The apparatus, as set forth in claim 1, wherein said additional valve means is actuated by said armature means.

4. The apparatus, as set forth in claim 3, wherein said armature means is pivotally mounted about a pivot axis and pivoted in response to said excitation coil, one of said two electromagnetically actuatable valve means for admitting said pressure chamber with normal pressure is disposed on one side of said pivot axis, said additional valve means is disposed on the other side of said pivot axis and openable in a direction opposite than that of said one of said two electromagnetically actuatable valve means, and arranged such that the latter alone is opened by a corresponding pivoting of said armature means about said pivot axis, and said one of said two electromagnetically actuatable valve means as well as said additional valve means is opened by an increased corresponding pivoting of said armature means about said pivot axis when said excitation coil becomes currentless.

5. The apparatus, as set forth in claim 1, wherein
said actuator means includes only a single pressure chamber constituting said previously mentioned pressure chamber.

6. The apparatus, as set forth in claim 4, further comprising
a common conduit connecting said one of said two electromagnetical actuatable valve means and said additional valve means with normal pressure,
said additional valve means includes,
a valve seat in said conduit communicating with said pressure chamber,
a ball moveably disposed in said conduit adjacent said valve seat.

spring means disposed in said conduit for pressing said ball against said valve seat,
a screw adjustably mounting in said armature means and having a free end abutting said ball, the latter being disposed between said spring means and said free end of said screw.

7. The apparatus, as set forth in claim 1, wherein
one of said two electromagnetically actuatable valve means is opened for admitting said pressure chamber with normal pressure in various of said operating positions of said armature means,
said additional valve means for admitting normal pressure into said pressure chamber together with said one of said two electromagnetically actuatable valve means when the latter is opened and when said excitation coil becomes currentless.

8. The apparatus, as set forth in claim 7, wherein
said cross-section of said passageway of said additional valve means is larger than that of said one of said two electromagnetically actuatable valve means.

* * * * *